United States Patent
Pal

(10) Patent No.: US 9,735,656 B2
(45) Date of Patent: Aug. 15, 2017

(54) ELECTRICAL MACHINES WITH LIQUID COOLING

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 504 days.

(21) Appl. No.: 14/336,676

(22) Filed: Jul. 21, 2014

(65) Prior Publication Data

US 2016/0020675 A1    Jan. 21, 2016

(51) Int. Cl.
H02K 9/22    (2006.01)
H02K 9/197    (2006.01)
H02K 3/34    (2006.01)

(52) U.S. Cl.
CPC .............. H02K 9/22 (2013.01); H02K 3/34 (2013.01); H02K 9/197 (2013.01)

(58) Field of Classification Search
CPC .. H01K 1/32; H01K 1/09; H01K 1/22; H01K 3/34; H01K 9/197
USPC ...................................... 310/54, 64
See application file for complete search history.

(56) References Cited

U.S. PATENT DOCUMENTS

| 2003/0146667 A1 | 8/2003 | Hattori et al. |
| 2004/0245883 A1 | 12/2004 | Mitcham et al. |
| 2005/0274540 A1 | 12/2005 | Smith et al. |
| 2009/0009012 A1* | 1/2009 | Stephens ................. C22C 19/07 310/54 |
| 2012/0175993 A1* | 7/2012 | Jang ....................... H02K 1/148 310/215 |

FOREIGN PATENT DOCUMENTS

| EP | 2187507 A1 | 5/2010 |
| WO | WO-2008133786 A1 | 11/2008 |

OTHER PUBLICATIONS http://www.engineeringtoolbox.com/thermal-conductivity-d_429.html.*
Search Report received in European Patent Application No. 15177720.8 Dated Nov. 26, 2015.
European Patent Office Official Examination Report Letter dated Jan. 18, 2017 for Application No. 15177720.8.

* cited by examiner

Primary Examiner — Terrance Kenerly
(74) Attorney, Agent, or Firm — Locke Lord LLP; Scott D. Wofsy; Christopher J. Cillié

(57) ABSTRACT

A core for an electrical machine has a segmented body with first segments and second segments. The first segments extend from a radially inner portion of the segmented body to a radially outer portion of the segmented body. The second segments are axially stacked in alteration with the first layers along an axis of the segmented body. The first segments have thermal conductivity greater than thermal conductivity of the second segments for transferring heat from the radially outer portion of the segmented body to the radially inner portion of the segmented body.

14 Claims, 5 Drawing Sheets

*Fig. 1*
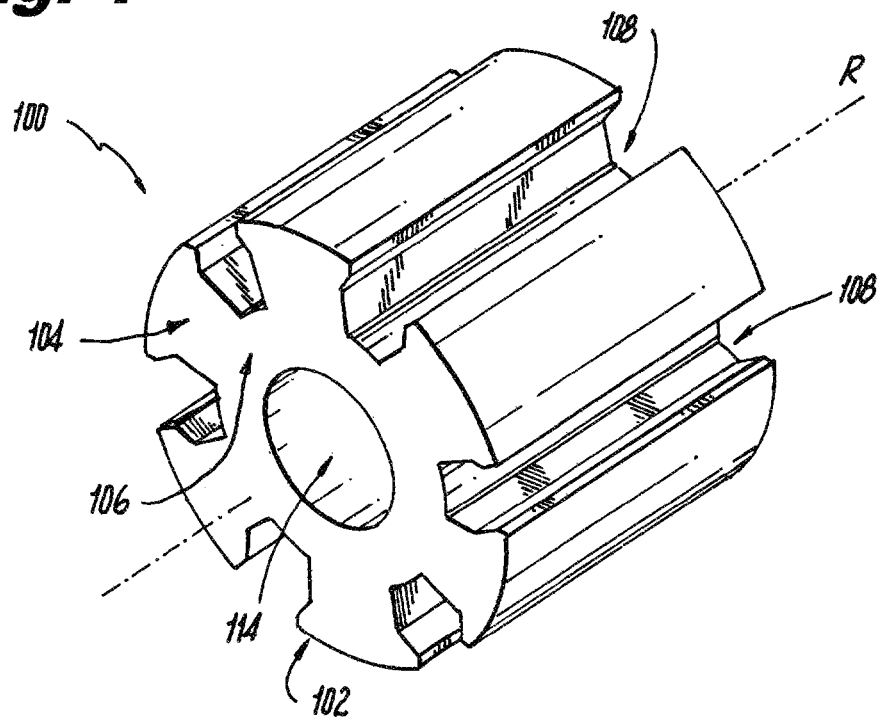
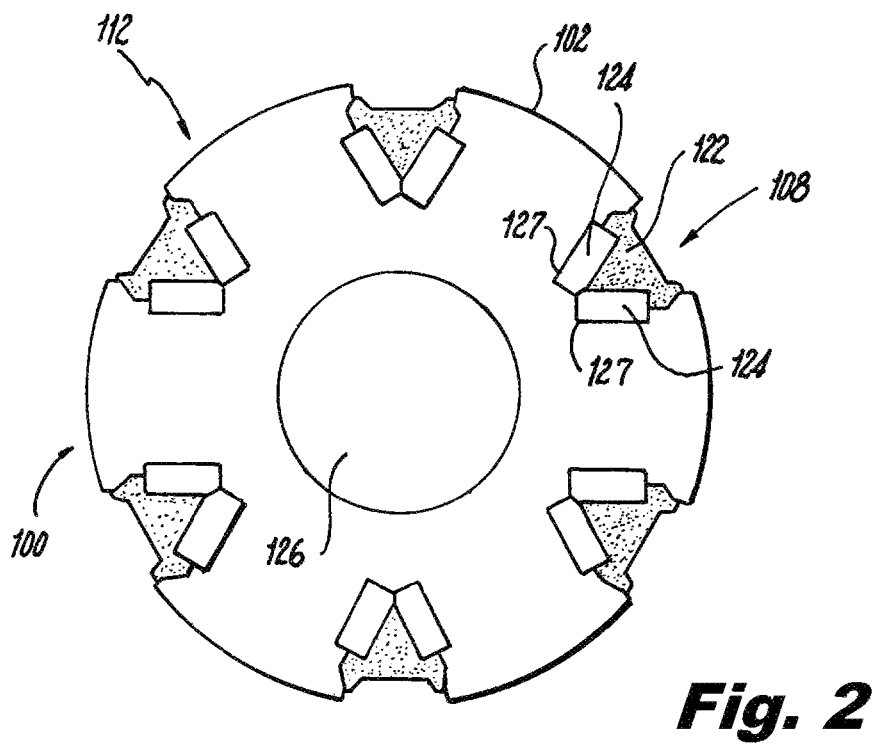
*Fig. 2*

ELECTRICAL MACHINES WITH LIQUID COOLING

BACKGROUND OF THE INVENTION

1. Field of the Invention

The present disclosure relates to electrical machines, and more particularly to liquid cooled electrical machines.

2. Description of Related Art

Electrical machines commonly have rotor and stator portions separated by a gap. Each portion generates a magnetic field, typically using windings or permanent magnets, that interact with one another as the rotor portion rotates in relation to the stator. In generator machines, mechanical energy input to the rotor portion induces a current flow in the windings suitable for use as electrical power. In motor machines, current applied to windings induces a magnetic field that generates an electromotive force that causes the rotor portion to rotate in relation to the stator portion and output mechanical energy. In both types of machines, electric current flowing through the windings generates heat that needs to be dissipated for reliable operation of the electrical machine.

Some generators require coolant to facilitate dissipation of heat into the ambient environment. One approach involves coolant systems that apply a coolant spray to the winding ends. While satisfactory for cooling the windings in certain applications, such systems can allow coolant to infiltrate the gap between the rotor portion and stator portion where it can reduce efficiency by increasing windage losses in the gap.

Such conventional methods and systems have generally been considered satisfactory for their intended purpose. However, there is still a need in the art for improved electrical machines and machine cooling systems. The present disclosure provides a solution for this need.

SUMMARY OF THE INVENTION

A core for an electrical machine has a segmented body with a plurality of first segments and a plurality of second segments stacked in alternation with the first segments axially. The first segments extend from a radially inner portion of the segmented body to a radially outer portion of the segmented body. The first segments have a thermal conductivity that is greater than the thermal conductivity of the second segments for transferring heat from the radially outer portion of the segmented body to the radially inner portion of the segmented body.

In certain embodiments the core defines a winding slot in the radially outer portion of the segmented body. An electrical insulator can be seated in the slot for electrically insulating a winding disposed within the winding slot. The electrical insulator can have a thermal conductivity that is greater than the thermal conductivity of the second segments, and can have a thermal conductivity greater than 1 Watt per meter degree Kelvin, for example.

In accordance with certain embodiments, the radially inner portion of the segmented body can define a central cavity. A heat exchanger can be seated in the central cavity and a shaft can be seated about the heat exchanger between the heat exchanger and the core. The heat exchanger can be in fluid communication with a coolant supply and a coolant return. In embodiments the heat exchanger is a finned heat exchanger having a plurality of fins distributed radially within the shaft cavity and/or arranged about as axis defined by the segmented body.

It is also contemplated that in certain embodiments the second segments can include a cobalt-iron alloy with about 49% cobalt. The second segments can have a thermal conductivity that greater than about twice a thermal conductivity of the first segments. Each of the first segments can have a laminated structure with an aluminum inner layer and oxide outer layers disposed on opposing axial faces of the aluminum layer. Nanofoil layers can be axially adjacent to the oxide layers on axial faces of the oxide layers opposite the aluminum layer. A reactive solder layer can be disposed between the oxide layer and the nanofoil layer. The nanofoil layer can have a greater thermal conductivity than the aluminum and/or oxide layers.

It is contemplated that the first segments can each have a composite layer. The composite layer can include a radially extending anisotropic thermal conduit thermally coupling the outer surface of the segmented body with the inner surface of the segmented body central cavity. The thermal conduit be bounded by a matrix material distributed circumferentially about the core, and can include carbon nanotubes or boron-nitride nanotubes fixed therein.

An electrical machine includes a rotor portion having a core as described above. The electrical machine includes a stator portion arranged adjacent the rotor portion and defining a gap therebetween. Windings seat within the winding slots and a heat exchanger seats within the central cavity such that the first segments radially transfer heat from the windings to the heat exchanger at a greater rate than the second segments.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a core for an electrical machine constructed in accordance with the present disclosure, showing a segmented body, winding slots and a central cavity of the core;

FIG. 2 is a cross-sectional axial end view of the core of FIG. 1, showing windings and electrical insulators disposed within winding slots defined by the core;

DETAILED DESCRIPTION OF THE PREFERRED EMBODIMENTS

Figure 3:
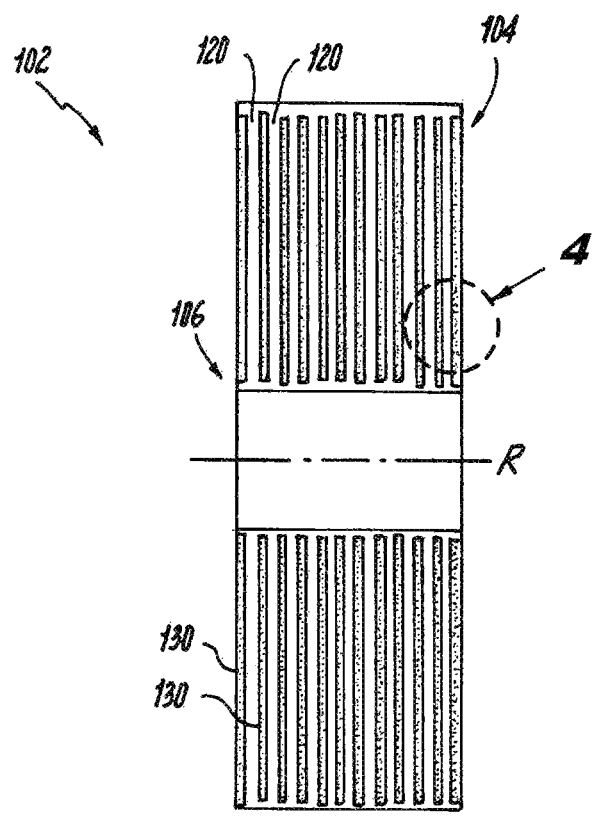
FIG. 3 a schematic cross-sectional side elevation view of an embodiment of a core, showing the segmented body of the core including a plurality of axially alternating first and second segments.

Reference will now be made to the drawings wherein like reference numerals identify similar structural features or aspects of the subject disclosure. For purposes of explanation and illustration, and not limitation, a partial view of an exemplary embodiment of a core for an electrical machine in accordance with the disclosure is shown in FIG. 1 and is designated generally by reference character 100. Other embodiments of rotor cores in accordance with the disclosure, or aspects thereof, are provided in FIGS. 2-7, as will be described. The systems and methods described herein can be used to enhance heat transfer in electrical machines such as aircraft motor starter generators for example.

With reference to FIG. 1, core 100 is shown. Core 100 has an axially segmented body 102 with a radially outer core portion 104 and a radially inner core portion 106. Radially outer core portion 104 defines a plurality of winding slots 108 that are distributed about circumference of segmented body 102. Winding slots 108 are configured and adapted to receive windings 124 (shown in FIG. 2) that generate electromagnetic fields for operation of an electrical machine. Radially inner core portion 106 defines a central cavity 114 having a rotation axis R extending therethrough. Central cavity 114 is configured and adapted to receive a shaft 116 (shown in FIG. 6) operatively associated with core 100. As described herein core 100 is a rotary core for an electrical machine including a stator portion extending about the circumference of core 100. It is to be understood and appreciated that, in certain embodiments, core 100 is a stator core for an electrical machine having a rotary portion extending about the circumference of core 100.

With reference to FIG. 2, a rotary portion 112 of an electrical machine is shown in an axial end view. Rotary portion 112 includes core 100. Core 100 includes segmented body 102, wedges 125, windings 124, and a shaft 116. Windings 124 seat within winding slots 108 and are arranged adjacent to core 100. Wedges 125 seat within winding slots 108 radially outward of windings 124. This forces windings 124 against the surface of core 100 within winding slots 108. Windings 124 include an insulator 127 that surrounds windings 124 and which electrically insulates windings 124 from core 100 and wedges 125. Shaft 116 seats within central cavity 114 (shown in FIG. 1) adjacent to an inner surface of central cavity 114.

Insulators 127 includes an electrical insulator material enveloping windings 124 and having relatively high thermal conductivity. This enables rapid heat transfer via thermal conduction from windings 124 to segmented body 102 for radially transfer toward shaft 116. One example of a suitable gap filler material is SILPAD K-10, available from the Bergquist Company of Chanhassan, Minn. Another example of a suitable gap filler material is T-flex 500, available from Thermagon, Inc. of Cleveland, Ohio. In embodiments, insulators 127 provides electrical insulation and has a thermal conductivity of between about 1 and 1.5 Watts per square meter-degree Kelvin. In certain embodiments, insulators 127 provide electrical insulation and have thermal conductivity of about 2.6 Watts per square meter-degree Kelvin.

With reference to FIG. 3, segmented body 102 is shown in longitudinal cross-section. Segmented body 102 includes a plurality of first segments 120 and an alternating plurality of second segments 130. First segments 120 and second segments 130 are laminated together to form a segmented body 102 with an integral structure and in an axially stacked arrangement. First segments 120 and second segments 130 extend from radially inner core portion 106 to radially outer core portion 104 about rotation axis R with second segments 130 axially interspersed between axially adjacent first segments 120.

Second segments 130 are formed from a material having relatively high tensile strength. This provides structural stability to segmented body 102 at high rotational speeds. This allows for the use of first segments 120 constructed with materials having relatively low tensile strength in applications with high rotational speed, e.g. rotor speeds between about 7,000 and 25,500 rotations per minute. In embodiments, second segments 130 include a cobalt-containing magnetic alloy. An example a suitable material is Hiperco®, available from Westinghouse Electric & Manufacturing Company of East Pittsburgh, Pa.

First segments 120 include a material with thermal conductivity greater than that of second segments 130. This creates a radially extending preferential heat rejection pathway through segmented body 102, i.e. between windings 124 (shown in FIG. 2) and shaft 116 (shown in FIG. 2). It can provide a segmented body 102 with an anisotropic heat rejection pathway routed through second segments 130 and extending from radially outer core portion 104 to radially inner core portion 106. In embodiments, first segments 120 include a layered stack including a high conductivity fill material.

Figure 4:
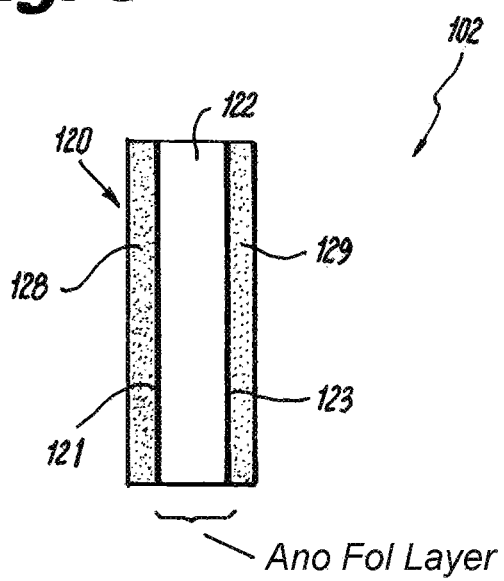
FIG. 4 is a schematic cross-section view of the portion of the core of FIG. 3, showing a first layer with aluminum, oxide, solder, and nanofoil layers.

With reference to FIG. 4, a portion of segmented body 102 including first segments 120 is shown. First segments 120 includes a thermally conducting layer 122, a first reactive solder layer 121, a second reactive solder layer 123, a first nanofoil layer 128, and a second nanofoil layer 129. First reactive solder layer 121 is axially disposed between thermally conducting layer 122 and first nanofoil layer 128. Second reactive solder layer 123 is disposed on an axially opposite side of thermally conducting layer 122 and between thermally conducting layer 122 and second nanofoil layer 129.

Thermally conducting layer 122 includes a thermally conductive material with high thermal conductivity, e.g. with thermal conductivity greater than that of second segments 130 (shown in FIG. 3). An example of a suitable material is ANO-FOL®, available from Metalloxyd GmbH of Kohn, Germany. In embodiments, first segments 120 include ANO-FOL® in an axially stacked arrangement formed from an aluminum core with oxide layers formed on each axial face of the aluminum-containing core. Cores with segmented bodies including ANO-FOL® occupying between about 30% to about 50% of first segments 120 can provide thermal conductivity that is between about two and four times as great as cores formed using conventional materials and structures. In certain embodiments, the strip has a total thickness of about 105 microns with the aluminum-containing core having an axial thickness of about 95 microns thick and the axial faces both having an axial thickness of about 5 microns. Any other suitable thickness can be used without departing from the scope of the present disclosure as suitable for a given application.

First reactive solder layer 121 and second reactive solder layer 123 bond to structures upon activation by an electrical voltage. The electrical voltage quickly melts the reactive soldier and the ANO-FOL® layer to the axially adjacent structures. In the illustrated embodiment, first reactive solder layer 121 bonds first nanofoil layer 128 to thermally conducting layer 122 and second reactive solder layer 123 bonds second nanofoil layer 129 to thermally conducting layer 122. This bonds thermally conducing layer 122 between first nanofoil layer 128 and second nanofoil layer 129. It is contemplated that, in embodiments, the nanofoil layers activate the respective adjacent reactive solder layer. This causes the reactive solder to bond the axially adjacent first and second layers, thereby forming a glueless laminated motor core. In certain embodiments, this provides a core with sufficient strength which can operate about 15 degrees Celsius cooler than conventional cores for a given core geometry and current load. It is to be understood and appreciated that reactive soldier is optional, and that any other suitable connecting structure or connection method is possible. For example, in certain embodiments, a stack of thermally conducting material and nanofoil is compressed axially by mechanical means during assembly to form first segments 120.

Figure 5:
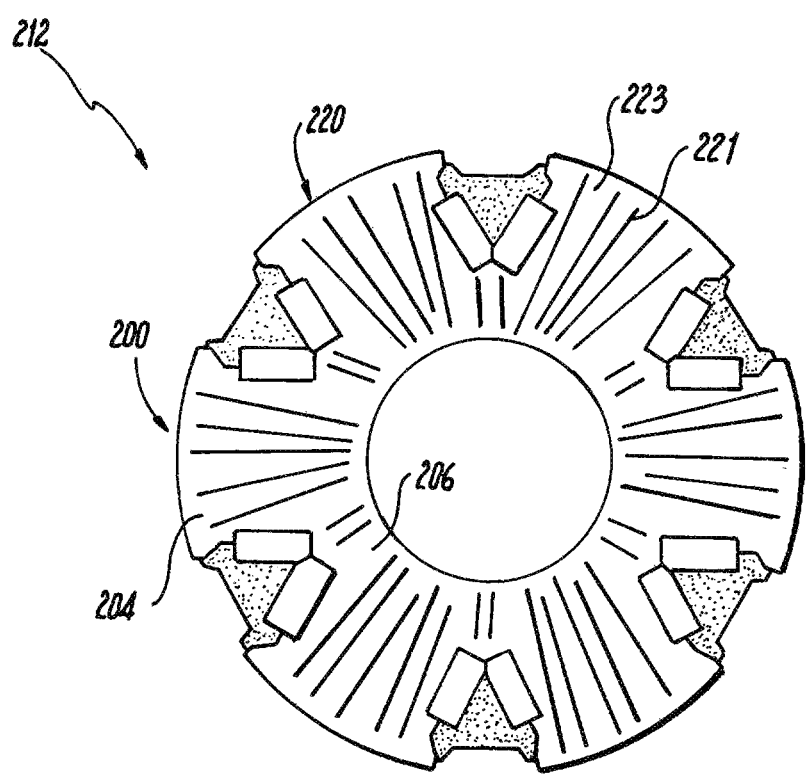
FIG. 5 a cross-sectional axial end view of a core in accordance with the present disclosure, showing a first segment with anisotropic thermal conduits.

With reference to FIG. 5, a rotary portion 212 of an electrical machine is shown. Rotary portion 212 is similar to rotary portion 112 with the addition a matrix material 223 and thermal conduits 221 disposed within first segments 220. Matrix material 223 is a glue or resin material that is configured and adapted to fix thermal conduits 221 in place. Thermal conduits 221 in turn include nanometer-scale tube-like structures, i.e. nanotubes, for enhancing heat flow through first segments 220 that extend radially between inner portion 206 and outer portion 204 of core 200. It is contemplated that the nanotubes can be carbon nanotubes or boron-nitride nanotubes. This can provide a core with a thermal conductivity that is between about 12 times and 32 times greater than a conventional core with anisotropic radially directed heat flow.

Figure 6:
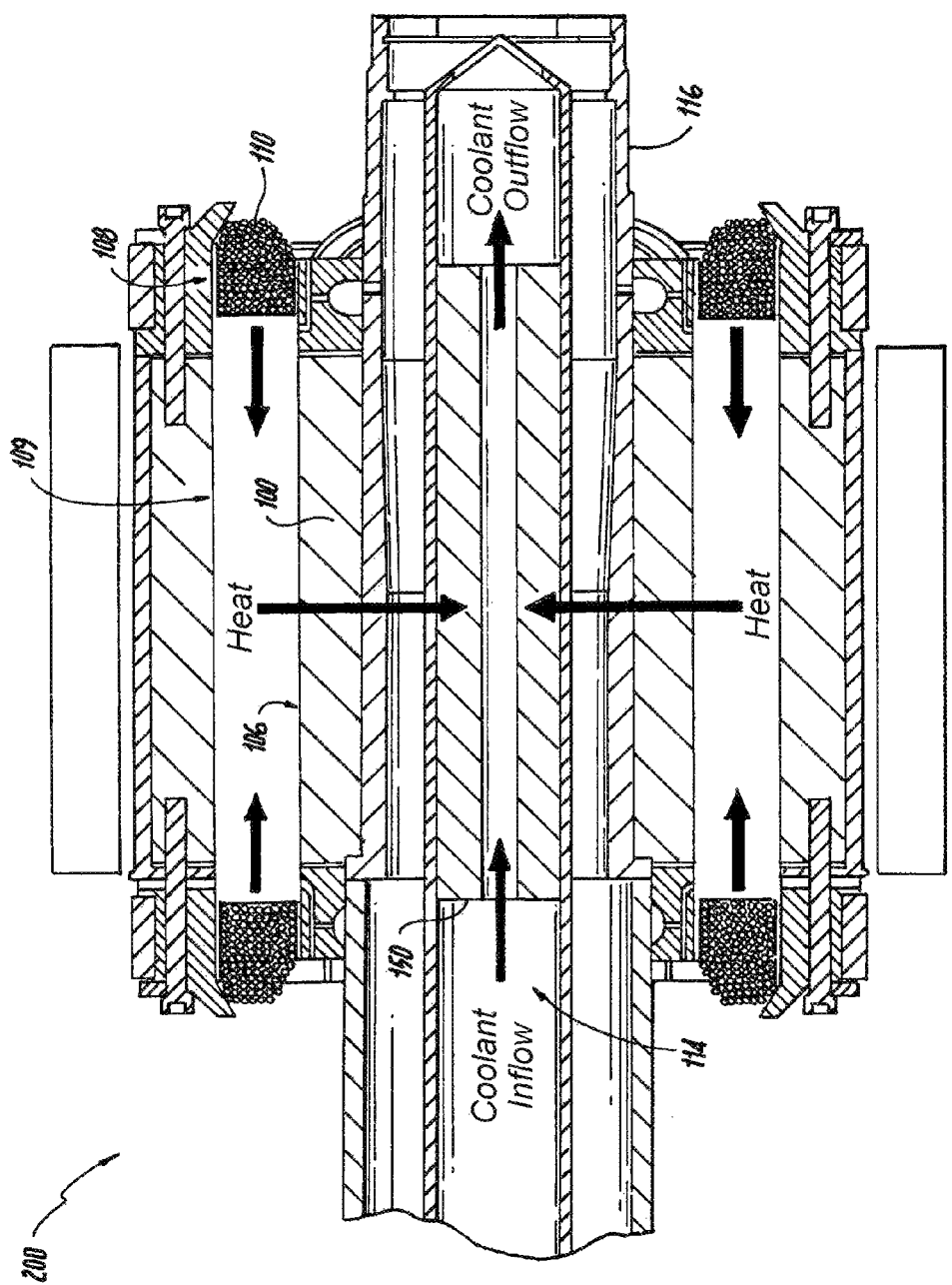
FIG. 6 is a cross-sectional view of a rotary portion of an electrical machine including the core of FIG. 1, showing a heat exchanger and shaft seated within a central cavity of the core.

With reference to FIG. 6, a heat transfer path through rotary portion 200 for an electrical machine is shown. Rotary portion 200 includes core 100. Core 100 includes windings 110 disposed in winding slots 108 arranged about radially outer core portion 104 and a heat exchanger 150 arranged shaft 116 within central cavity 114. Current flowing through windings 110 generates heat. This heat (illustrated with flow arrows) flows from radially outer core portion 104 to radially inner core portion 106 of core 100. Core 100 transfers this heat directionally, i.e. radially inward, to a radially inner core portion 106 of core 100 and thereafter into shaft 116. Shaft 116 in turn transfers the heat into heat exchanger 150. Heat exchanger 150 transfers the heat into a coolant flow received axially through shaft 116 that enters on a first end and exits on a second opposite end of rotary portion 200.

Figure 7:
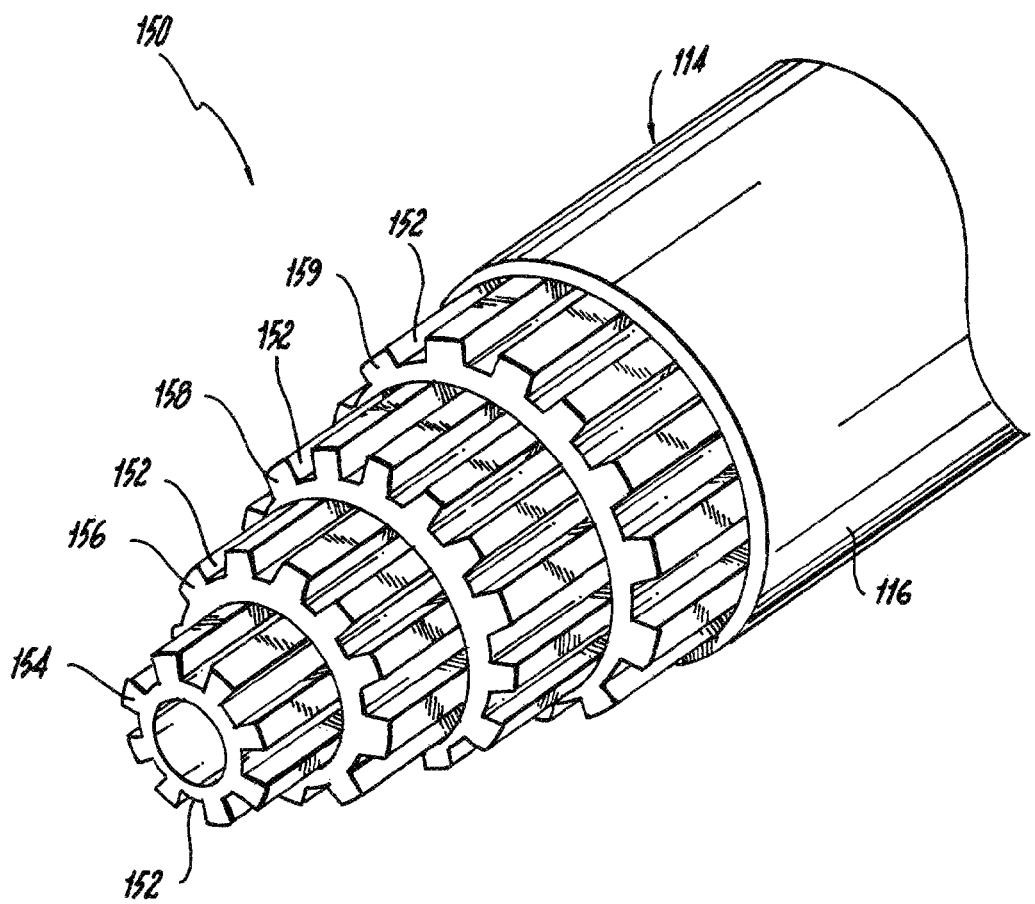
FIG. 7 is an axial end view of the rotary portion of the electrical machine of FIG. 6, showing a finned structure of heat exchanger for dissipating heat into coolant traversing the heat exchanger.

With reference to FIG. 7, heat exchanger 150 is shown schematically in axial view. Heat exchanger 150. Heat exchanger 150 is seated in central cavity 114 and is in fluid communication with a coolant supply and coolant return. Heat exchanger 150 includes a plurality of fins 152 distributed radially within central cavity 114. As illustrated, fins 152 are arranged in a first circumferential group 154 extending about axis R, a second circumferential group 156 arranged radially outward of first circumferential group 154, a third circumferential group arranged radially outward of second circumferential group 156, and a fourth circumferential group arranged radial outward of the third circumferential group and adjacent to shaft 116.

Conventional liquid cooled generators employ spray cooling to cool the rotor and stator end windings. In such conventional liquid cooled generators, small amounts of the liquid coolant applied to the rotor and stator end windings can infiltrate the gap between the rotor and stator portions of the generator. This can significantly increase windage losses between the rotor and stator, particularly at high-speed operation. Increased windage losses in turn increase heat rejection and reduce efficiency and increase the load on the vehicle thermal management system.

In embodiments of the segmented cores described herein, liquid spray cooling can be eliminated by improving the internal thermal conductivity with highly conductive material embedded between lamination layers of the core. This allows for cooling the windings by conducting heat from the winding to the core. From the core the heat conducts into to the inner diameter of the core, and therefrom into an oil-cooled heat exchanger disposed within the rotor core. Such 'dry' cooled cores have lower heat rejection characteristics due to reduction in windage losses compared to spray cooled cores. This can reduce the amount of heat that is necessary to be removed from the core by upwards of 80% in high-speed cores, e.g. in electrical machines with rotational speeds in excess of 7,000 rotations per minute.

The methods and systems of the present disclosure, as described above and shown in the drawings, provide for electrical machine cores with superior properties including improved rates of heat transfer. In embodiments, cores described herein can provide for dry cooled, i.e. without coolant spray applied to the windings, electrical machines. Such dry cooled machines can operate at high rotor speeds with reduced heat rejection requirements due to the reduced windage losses from liquid coolant infiltration into the gap between the stator and rotor portions of the electrical machine. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A core for an electrical machine, comprising:
a segmented body including first segments extending from a radially inner portion of the body to a radially outer portion of the body and second segments stacked in alternation with the first segments axially, wherein the first segments have thermal conductivity that are greater than thermal conductivity of the second segments for transferring heat from the radially outer portion of the body to the radially inner portion of the body,
wherein at least one of the first segments is an aluminum-containing segment,
wherein the at least one of the first layers includes an oxide layer bonded to an axial face of the aluminum-containing layer, and
further including a solder layer bonding the oxide layer to an axially adjacent second layer.

2. The core as recited in claim 1, wherein the thermal conductivity of first segments are greater than about twice the thermal conductivity of the second segments.

3. A core as recited in claim 1, wherein the second segments include a cobalt-iron alloy having about 49% cobalt.

4. The core as recited in claim 1, wherein the core surface defines a winding slot with an electrical insulator seated therein, wherein the electrical insulator has a thermal conductivity that is greater than the thermal conductivity of the second segments.

5. The core as recited in claim 4, wherein the electrical insulator has a thermal conductivity greater than 1 Watt per meter degree Kelvin.

6. The core as recited in claim 1, further including a heat exchanger seated in the central cavity and in fluid communication with a coolant supply and a coolant return.

7. The core as recited in claim 6, wherein the heat exchanger includes a plurality of fins distributed radially within the central cavity.

8. The core as recited in claim 6, further including a shaft extending about a periphery of the heat exchanger and between the segmented body and heat exchanger.

9. A core for an electrical machine, comprising:
a segmented body including first segments extending from a radially inner portion of the body to a radially outer portion of the body and second segments stacked in alternation with the first segments axially,
wherein the first segments have thermal conductivity that are greater than thermal conductivity of the second segments for transferring heat from the radially outer portion of the body to the radially inner portion of the body,
wherein at least one of the first segments is an aluminum-containing segment,
wherein the at least one of the first layers includes an oxide layer bonded to an axial face of the aluminum-containing layer, and
wherein the oxide layer is a first oxide layer, and further including a second oxide layer bonded to an axial face opposite the first oxide layer, wherein the second oxide layer is bonded to a second segment axially adjacent to the second oxide layer.

10. The core as recited in claim 9, further including a heat exchanger seated in the central cavity and in fluid communication with a coolant supply and a coolant return.

11. A core for an electrical machine, comprising:
a segmented body including first segments extending from a radially inner portion of the body to a radially outer portion of the body and second segments stacked in alternation with the first segments axially,
wherein the first segments have thermal conductivity that are greater than thermal conductivity of the second segments for transferring heat from the radially outer portion of the body to the radially inner portion of the body,
wherein the segmented body defines a central cavity and the first segments include radially extending anisotropic thermal conduits thermally coupling outer and inner surfaces of the segmented body.

12. The core as recited in claim 11, wherein the anisotropic thermal conduits include carbon nanotubes or boron-nitride nanotubes fixed within in a matrix material.

13. The core as recited in claim 11, further including a heat exchanger seated in the central cavity and in fluid communication with a coolant supply and a coolant return.

14. An electrical machine, comprising:
a stator portion; and
a rotor portion adjacent the stator portion and defining a gap therebetween, wherein rotor portion includes a core defining a winding slot and a central cavity, the core including:
windings disposed in the winding slot;
an electrical insulator disposed between the windings and the winding slot;
a heat exchanger disposed within the central cavity;
a shaft seated between the heat exchanger and the core; and
a segmented body including first segments extending from a radially inner portion of the body to a radially outer portion of the body and second segments stacked in alteration with the first segments axially,
wherein the first segments have thermal conductivity greater than thermal conductivity of the second segments for directionally transferring heat from the windings to the heat exchanger at a greater rate than the second segments
wherein the segmented body defines a central cavity and the first segments include radially extending anisotropic thermal conduits thermally coupling outer and inner surfaces of the segmented body.

* * * * *